US012626256B2

(12) United States Patent
Afzal

(10) Patent No.: US 12,626,256 B2
(45) Date of Patent: May 12, 2026

(54) SYSTEMS AND METHODS FOR PARALLEL HYBRID MODEL ANALYSIS

(71) Applicant: MASTERCARD INTERNATIONAL INCORPORATED, Purchase, NY (US)

(72) Inventor: Sayed Amin Afzal, Chesterfield, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 79 days.

(21) Appl. No.: 18/493,247

(22) Filed: Oct. 24, 2023

(65) Prior Publication Data

US 2025/0131437 A1 Apr. 24, 2025

(51) Int. Cl.
*G06Q 20/40* (2012.01)
*G06N 3/048* (2023.01)

(52) U.S. Cl.
CPC ......... *G06Q 20/4016* (2013.01); *G06N 3/048* (2023.01)

(58) Field of Classification Search
CPC ........................... G06Q 20/4016; G06N 3/048
USPC ........................................................ 705/44
See application file for complete search history.

(56) References Cited

U.S. PATENT DOCUMENTS

| | | | |
|---|---|---|---|
| 7,764,231 B1 | 7/2010 | Karr | |
| 10,419,463 B2 | 9/2019 | Muddu | |
| 10,640,037 B1 | 5/2020 | Mitra | |
| 10,754,899 B2 | 8/2020 | Murray | |
| 11,188,850 B2 | 11/2021 | Pisner | |
| 11,416,551 B2 | 8/2022 | Murray | |
| 2021/0117977 A1* | 4/2021 | Kim | G06F 18/214 |
| 2022/0284435 A1* | 9/2022 | Zhao | G06N 3/09 |
| 2022/0284459 A1* | 9/2022 | Kwok | G06Q 30/0206 |
| 2022/0358507 A1* | 11/2022 | Poduval | G06Q 20/36 |
| 2023/0007024 A1 | 1/2023 | Maria Vega | |

FOREIGN PATENT DOCUMENTS

CN 112464094 A 3/2021

OTHER PUBLICATIONS

PCT International Search Report and Written Opinion, Application No. PCT/US2024/045800, dated Dec. 20, 2024, 9 pages.

* cited by examiner

*Primary Examiner* — Hai Tran
(74) *Attorney, Agent, or Firm* — Armstrong Teasdale LLP

(57) ABSTRACT

A parallel hybrid model analysis system is provided. The system includes a memory device, and at least one processor coupled thereto. The processor programmed to: store a plurality of models including a first model of a first model type and a second model of a second model type wherein the first model type and the second model type are different; receive at least one data record to be analyzed; execute the first model with the at least one data record as input to receive one or more weight values as output; execute the second model with the at least one data record as input to receive a partial score as output; combine the one or more weight values with the partial score to generate a final score; and analyze the final score to determine if one or more alerts should be electronically transmitted to a user device.

20 Claims, 6 Drawing Sheets

SYSTEMS AND METHODS FOR PARALLEL HYBRID MODEL ANALYSIS

BACKGROUND

The present application relates generally to parallel hybrid model analysis, and more particularly, to computer-based systems and methods for using multiple machine learning models in parallel.

In at least some data analysis systems, a model may be trained using machine learning techniques to detect patterns within the data. However, as the number of data records analyzed and the number of variables to be tracked increases, the difficulty of training such a model also increases, in some cases exponentially. Also, using the known systems for data analysis, the more complicated the analysis, the more computational resources may be needed to perform the analysis.

Generating and training a single model that can address all of the potential details in analyzing large numbers of data records may be overly large, complicated, and difficult to use and may require significant computing resources to execute. Furthermore, adding the capability to handle new details may be difficult and the single model may become unwieldy to use. These large models can also lack the needed accuracy and granularity in producing results. Conventional techniques may have additional encumbrances, inefficiencies, ineffectiveness, and drawbacks as well. Accordingly, a more resource efficient system and/or method for data analysis systems would be desirable.

BRIEF DESCRIPTION

In one aspect, a parallel hybrid model analysis system is provided. The parallel hybrid model analysis system includes a memory device and at least one processor coupled to the memory device. The at least one processor is programmed to store a plurality of models including a first model of a first model type and a second model of a second model type. The first model type and the second model type are different. The at least one processor is also programmed to receive at least one data record to be analyzed. The at least one processor is further programmed to execute the first model with the at least one data record as input to receive one or more weight values as output. In addition, the at least one processor is programmed to execute the second model with the at least one data record as input to receive a partial score as output. Moreover, the at least one processor is programmed to combine the one or more weight values with the partial score to generate a final score. Furthermore, the at least one processor is programmed to analyze the final score to determine if one or more alerts should be electronically transmitted to a user device.

In another aspect, a computer-implemented method for parallel hybrid model analysis is provided. The method is implemented on a computing device comprising a memory device coupled to at least one processor. The method includes storing a plurality of models including a first model of a first model type and a second model of a second model type. The first model type and the second model type are different. The method also includes receiving at least one data record to be analyzed. The method further includes executing the first model with the at least one data record as input to receive one or more weight values as output. In addition, the method includes executing the second model with the at least one data record as input to receive a partial score as output. Moreover, the method includes combining the one or more weight values with the partial score to generate a final score. Furthermore, the method includes analyzing the final score to determine if one or more alerts should be electronically transmitted to a user device.

In a further aspect, at least one non-transitory computer-readable storage media having computer-executable instructions embodied thereon for authenticating an online user is provided. When executed by at least one processor, the computer-executable instructions cause the at least one processor to store a plurality of models including a first model of a first model type and a second model of a second model type. The first model type and the second model type are different. The computer-executable instructions also cause the at least one processor to receive at least one data record to be analyzed. The computer-executable instructions further cause the at least one processor to execute the first model with the at least one data record as input to receive one or more weight values as output. In addition, the computer-executable instructions cause the at least one processor to execute the second model with the at least one data record as input to receive a partial score as output. Moreover, the computer-executable instructions cause the at least one processor to combine the one or more weight values with the partial score to generate a final score. Furthermore, the computer-executable instructions further cause the at least one processor to analyze the final score to determine if one or more alerts should be electronically transmitted to a user device.

BRIEF DESCRIPTION OF THE DRAWINGS

FIG. 1 is a schematic diagram illustrating an example parallel hybrid model analysis (PHMA) platform in communication with a multi-party payment processing system for processing transactions in accordance with one embodiment of the present disclosure.

FIG. 2 is an expanded block diagram of an example embodiment of a computer system used for parallel hybrid model analysis.

FIG. 3 illustrates a flow diagram of an example process of analyzing data using parallel hybrid model analysis implemented using the system shown in FIG. 2.

FIG. 4 illustrates an example configuration of a user computing device.

FIG. 5 illustrates an example configuration of a server system, such as the parallel hybrid model analysis (PHMA) platform shown in FIG. 1, in accordance with one example embodiment of the present disclosure.

FIG. 6 is a flow diagram of an example process for parallel hybrid models using the PHMA system shown in FIG. 2.

Figure 1:
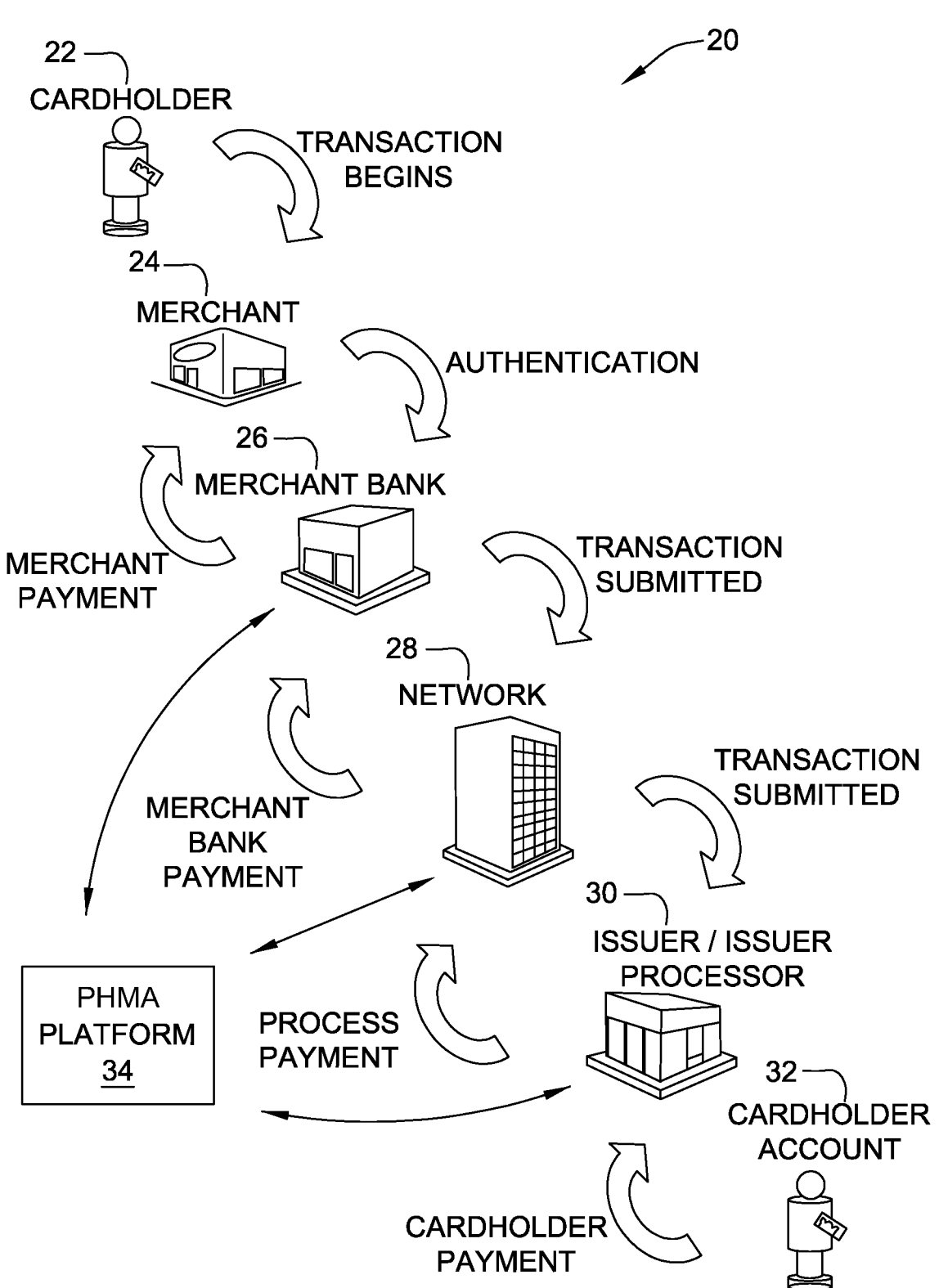
FIGS. 1-6 show example embodiments of the methods and systems described herein.

Although specific features of various embodiments may be shown in some drawings and not in others, this is for convenience only. Any feature of any drawing may be referenced and/or claimed in combination with any feature of any other drawing.

DETAILED DESCRIPTION

The systems and methods described herein relate generally to using multiple machine learning (ML) trained models in parallel. The systems and methods described herein recite a parallel hybrid model analysis system, which allows users to analyze data records using a plurality of models with multiple different model types.

By way of example and not by way of limitation, one embodiment of the systems and methods described herein includes using multiple models in parallel to analyze data and then determine the final results based on combining the results of the different models. This allows the parallel hybrid model analysis (PHMA) system to analyze data from large collections of records and compare that analysis to new records. In some embodiments, the historical records are used to train the models and the new records (e.g., model input variables) are analyzed using those models to determine results in real-time. Furthermore, as described herein, the patterns of data may change over time, so the new records are also used to update the models (e.g., re-train the models) for use with future records that need to be analyzed. In the exemplary embodiment, the data records may include, but are not limited to, messages, images, financial transactions, and/or any other type of data record.

In the exemplary embodiment, at least two different types of models are used in the plurality of models. In the exemplary embodiment, the first model type is a cluster model, such as, but not limited to a k-means clustering model. The second model type is a supervised learning neural network model, such as, but not limited to, one trained with a multilayer perceptron algorithm or other feed forward algorithms. In other embodiments, other models may be used in this system.

In the exemplary embodiment, there are two models of the first model type (e.g., cluster model type). These two models are each associated with one option of a two-option parameter of the data records to be analyzed, where the first model of the first model type is trained with data records that have the first parameter option, and the second model of the first model type is trained with data records that have the second parameter option. For example, if the models are being applied to a message as the data record, the option parameter could be if the message was transmitted or receive. In an example where an image is the data record, the option parameter could be if the image is an inside (e.g., inside a building) or an outside (e.g., outside a building) image. In a transaction example, the option parameter could be if the transaction is a debit transaction or a credit transaction. These above examples are provided for illustration and are not intended to limit this disclosure in any way. Furthermore, in some embodiments, there may be three or more models of the first model type where each of the three or more models is for a different selection or option of the parameter.

In the exemplary embodiment, there are also two models of the second model type. These two models are each associated with one or more parameters of the data records to be analyzed, where the first model of the second model type is trained with data records that have its selected parameters and the second model of the second model type is trained with data records that have its selected parameters. In some embodiments, the selected parameters are the same for the two models, but have different options selected. In other embodiments, the selected parameters are different for the two models. In the message example from above, the parameter could be if the message was a specific message type. In the image example from above, the parameter could be if the image includes one or more desired objects, such as a table or a person. In the transaction example from above, the parameter could be based upon the transaction type. These above examples are provided for illustration and are not intended to limit the disclosure in any way. Furthermore, in some embodiments, there may be three or more models of the second model type where each of the three or more models is for a different selection of the parameter or for a different parameter.

In some embodiments, in addition to training the models, the PHMA system also tracks velocities for one or more of the parameters of the data records. The velocities may include exponential decay velocities to account for or more heavily weight the more current data in comparison to older data. This may be done to allow the PHMA system to detect current patterns.

In the exemplary embodiment, the PHMA system receives a data record to be analyzed, such as, but not limited to, a message, an image, a transaction, and/or any other data record. In some embodiments, the PHMA system receives, analyzes, and reports on the data record in real-time. The PHMA system determines which models to execute for the data record. The PHMA system determines which option has been selected on the parameter(s) associated with the first model type. Then the PHMA system executes the model associated with that option using the data record as input. In the exemplary embodiment, the first model type includes clustering models. Accordingly, the model assigns the data record to a cluster and reports the cluster to the PHMA system. In the exemplary embodiment, each cluster is assigned a weight and the PHMA system uses that weight in generating a score for the data record.

The PHMA system also determines which models of the second model type to execute with the data record based upon the associated parameters and those parameter values. The PHMA system then executes the selected model(s) with the data record as an input. The executed model(s) output one or more partial scores and/or weights for the data record. The PHMA system uses the one or more partial scores and/or weights in generating a score for the data record. In the exemplary embodiment, the output from the model of the first model type and the output from the model(s) of the second model type are combined to generate a score for the data record.

In at least one embodiment, the generated score from the outputs of the models is a raw score. In this embodiment, the PHMA system generates a final score via a sigmoid function so that the final score is between 0 to 1, but any scoring range could be used.

In some further embodiments, the PHMA system generates a reason code to explain why the system scored the data record the way that it did. This allows for additional and more nuanced information to be provided to the user. The reason code assignment is independent from the score. The PHMA system may have a plurality of reason codes that may be assigned based on different results and different reasons for the score.

One potential, non-limiting use for the parallel hybrid model system is for detecting patterns in payment transactions that may be indicative of money laundering. For the anti-money laundering implementation, one of the purposes is to detect suspicious accounts that may be potentially committing money laundering. The data records are payment transactions being processed by a payment network as described below. For this implementation, the first model type includes K-means clustering models. There are two models of the first model type. The first model is for credit transactions. The second model is for debit and/or prepaid transactions. The first and second model are trained to cluster the payment transaction based upon how risky the payment transaction is. In other words, how likely the transaction is associated with or part of a money laundering scheme. If it is determined that there is a high likelihood that a particular transaction is part of a money laundering scheme, then that particular transaction is considered high risk. If the payment transaction is assigned to a high-risk cluster, then the raw score is amplified. If the payment transaction is assigned to low-risk cluster, then the raw score is attenuated.

For the anti-money laundering implementation, the second model type is a supervised learning trained neural network model using the multilayer perceptron algorithm. In this implementation, the first model of the second model type is for ATM (automated teller machine) transactions. The second model of the second model type is for money-send transactions. Money-send transactions are for real-time money transfers by issuers connected to the payment network.

The PHMA system receives any scores from the models of the second model type and the assigned cluster IDs from the model of the first model type. The PHMA system determines the weight(s) associated with the cluster ID and modifies the scores with those weights to determine the raw score. Then the PHMA system executes a sigmoid function to determine the final score. One example of a sigmoid function is below in Equation 1.

$$Score = 1/(1 + EXP(-c*(raw\_score^p - a)))$$ EQ. 1

In the anti-money-laundering implementation, a reason code is calculated to allow the user to know the main reason why the account associated with the transaction is flagged as being associated with a money laundering scheme. In this implementation, the reason code assignment is determined independently from the score. In this implementation, there are seven reason codes. Six of the reason codes are specific to anti-money laundering typology groups. One of the reason codes indicates an abnormal amount of U.S. dollars.

For the purpose of this implementation, each typology group has its own transaction velocity, which is a high-risk velocity. The PHMA system then calculates the appropriate reason code from the velocities and the payment transaction. In this case, the transaction velocity for each of the reason code categories using an exponential decay velocity for transactions of the corresponding type for the last 56 days.

In this implementation, the final score and the reason code are returned to the user. For example, the score and the reason code may be returned to the network and/or issuer associated with the payment transaction. The score and reason code may also be transmitted to other individuals. In some embodiments, when the score exceeds one or more thresholds, the PHMA system generates and transmits one or more alerts and/or notifications.

While the above describes the parallel hybrid model analysis system being used for an anti-money laundering implementation, one having skill in the art would understand that other implementations may be used as well. For a non-limited example, the parallel hybrid model analysis system may be used to analyze and classify multiple types of data records including, but not limited to, message traffic and images to determine one or more other trends and/or patterns. The systems could also be used for analyzing other data records; data that is not necessarily related to money laundering or even financial transactions. The system should not be limited to such applications.

At least one of the technical problems addressed by this system includes: (i) increased accuracy of analysis of large amounts of data using machine learning and/or artificial intelligence techniques; (ii) reduced amount of required computer processing resources for analyzing large amounts of data and detecting patterns and trends within the data; (iii) decreased complexity in analyzing significant amounts of data; and (iv) reduced mis-classification of fraudulent transactions.

A technical effect of the systems and processes described herein is achieved by performing at least one of the following steps: a) store a plurality of models including a first model of a first model type and a second model of a second model type, wherein the first model type and the second model type are different; b) receive at least one data record to be analyzed; c) execute the first model with the at least one data record as input to receive one or more weight values as output; d) execute the second model with the at least one data record as input to receive a partial score as output; e) combine the one or more weight values with the partial score to generate a final score; f) analyze the final score to determine if one or more alerts should be electronically transmitted to a user device; g) store a third model of the first model type; h) determine which model of the first model and the third model to execute based on a first attribute of the at least one data record, wherein the first attribute is a binary attribute; i) store a fourth model of the second model type; j) determine whether to execute the second model or the fourth model based upon one or more attributes of the at least one data record; k) wherein the first model type is a K-means clustering model; l) wherein the one or more weight values are based upon which cluster the at least one data record is assigned to; m) wherein the second model type is trained using a multilayer perception algorithm via supervised machine learning; n) execute a sigmoid function, wherein to combine the one or more weight values with the partial score to generate a final score; o) determine a reason code for the final score based at least in part upon the one or more weight values; p) wherein the at least one data record is a payment transaction, and q) the system is trained to detect a potential money laundering scheme that includes the at least one data record.

As will be appreciated, based on the description herein, the technical improvement in the parallel hybrid model analysis system as described herein is a computer-based solution to a technical deficiency or problem that is itself rooted in computer technology (e.g., the problem itself derives from the use of computer technology). More specifically, data analysis systems require tremendous amounts of resources when analyzing large amounts of data. Parallel hybrid model analysis methodologies (e.g., PHMA) are useful to more efficiently process and analyze transactions and messages in an efficient manner and significantly reduce the computer processing resources required to analyze large amounts of data. Accordingly, to address this problem, the systems and methods described herein address this technical problem by using a parallel hybrid model analysis (PHMA) server and PHMA engine to analyze large amounts of data in reduced time and with reduced model training time and resources.

The following detailed description of the embodiments of the disclosure refers to the accompanying drawings. The same reference numbers in different drawings may identify the same or similar elements. Also, the following detailed description does not limit the claims.

Described herein are computer systems such as online authentication computer systems. As described herein, all such computer systems include a processor and a memory. However, any processor in a computer device referred to herein may also refer to one or more processors wherein the processor may be in one computing device or a plurality of computing devices acting in parallel. Additionally, any memory in a computer device referred to herein may also refer to one or more memories wherein the memories may be in one computing device or a plurality of computing devices acting in parallel.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the term "database" may refer to either a body of data, a relational database management system (RDBMS), or to both. As used herein, a database may include any collection of data including hierarchical databases, relational databases, flat file databases, object-relational databases, object oriented databases, and any other structured collection of records or data that is stored in a computer system. The above examples are example only, and thus are not intended to limit in any way the definition and/or meaning of the term database. Examples of RDBMS's include, but are not limited to including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, California; IBM is a registered trademark of International Business Machines Corporation, Armonk, New York; Microsoft is a registered trademark of Microsoft Corporation, Redmond, Washington; and Sybase is a registered trademark of Sybase, Dublin, California.)

In one embodiment, a computer program is provided, and the program is embodied on a computer readable medium. In an example embodiment, the system is executed on a single computer system, without requiring a connection to a sever computer. In a further embodiment, the system is being run in a Windows® environment (Windows is a registered trademark of Microsoft Corporation, Redmond, Washington). In yet another embodiment, the system is run on a mainframe environment and a UNIX® server environment (UNIX is a registered trademark of X/Open Company Limited located in Reading, Berkshire, United Kingdom). In a further embodiment, the system is run on an iOS® environment (iOS is a registered trademark of Cisco Systems, Inc. located in San Jose, CA). In yet a further embodiment, the system is run on a Mac OS® environment (Mac OS is a registered trademark of Apple Inc. located in Cupertino, CA). In still yet a further embodiment, the system is run on Android® OS (Android is a registered trademark of Google, Inc. of Mountain View, CA). In another embodiment, the system is run on Linux® OS (Linux is a registered trademark of Linus Torvalds of Boston, MA). The application is flexible and designed to run in various different environments without compromising any major functionality. In some embodiments, the system includes multiple components distributed among a plurality of computing devices. One or more components may be in the form of computer-executable instructions embodied in a computer-readable medium.

As used herein, an element or step recited in the singular and proceeded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

Furthermore, as used herein, the term "real-time" refers to at least one of the time of occurrence of the associated events, the time of measurement and collection of predetermined data, the time for a computing device (e.g., a processor) to process the data, and the time of a system response to the events and the environment. In the embodiments described herein, these activities and events may be considered to occur substantially instantaneously.

As used herein, the terms "payment device," "transaction card," "financial transaction card," and "payment card" refer to any suitable transaction card, such as a credit card, a debit card, a prepaid card, a charge card, a membership card, a promotional card, a frequent flyer card, an identification card, a prepaid card, a gift card, and/or any other device that may hold payment account information, such as mobile phones, Smartphones, personal digital assistants (PDAs), wearable computing devices, key fobs, and/or any other computing devices capable of providing account information. Moreover, these terms may refer to payments made directly from or using bank accounts, stored valued accounts, mobile wallets, etc., and accordingly are not limited to physical devices but rather refer generally to payment credentials. Each type of payment device can be used as a method of payment for performing a transaction. In addition, consumer card account behavior can include but is not limited to purchases, management activities (e.g., balance checking), bill payments, achievement of targets (meeting account balance goals, paying bills on time), and/or product registrations (e.g., mobile application downloads).

The systems and processes are not limited to the specific embodiments described herein. In addition, components of each system and each process can be practiced independent and separate from other components and processes described herein. Each component and process also can be used in combination with other assembly packages and processes.

The following detailed description illustrates embodiments of the disclosure by way of example and not by way of limitation. It is contemplated that the disclosure has general application to authenticating users for transactions conducted over an electronic payment network.

FIG. 1 is a schematic diagram illustrating an example parallel hybrid model analysis (PHMA) platform 34 in communication with a multi-party payment processing system 20 for processing transactions in accordance with one embodiment of the present disclosure. FIG. 1 depicts a flow of data for a financial transaction through system 20. Embodiments described herein may relate to a transaction card system, such as a credit card payment system using the MASTERCARD® interchange network. The MASTERCARD® interchange network is a set of proprietary communications standards promulgated by Mastercard International Incorporated® for the exchange of financial transaction data and the settlement of funds between financial institutions that are members of Mastercard International Incorporated®. (MASTERCARD® is a registered trademark of Mastercard International Incorporated located in Purchase, New York).

In the exemplary transaction card system, a financial institution called the "issuer" issues a transaction card, such as a credit card, to a consumer or cardholder 22, who uses the transaction card to tender payment for a purchase from a merchant 24. Cardholder 22 may purchase goods and services ("products") at merchant 24. Cardholder 22 may make such purchases using virtual forms of the transaction card and, more specifically, by providing data related to the transaction card (e.g., the transaction card number, expiration date, associated postal code, and security code) to initiate transactions. To accept payment with the transaction card or virtual forms of the transaction card, merchant 24 must normally establish an account with a financial institution that is part of the financial payment system. This financial institution is usually called the "merchant bank," the "acquiring bank," or the "acquirer." When cardholder 22 tenders payment for a purchase with a transaction card or virtual transaction card, merchant 24 requests authentication of the cardholder 22 and authorization from a merchant bank 26 for the amount of the purchase. The request may be performed over the telephone or electronically, but is usually performed through the use of a point-of-sale terminal, which reads cardholder's 22 account information from a magnetic stripe, a chip, or embossed characters on the transaction card and communicates electronically with the transaction processing computers of merchant bank 26. Merchant 24 receives cardholder's 22 account information as provided by cardholder 22. Alternatively, merchant bank 26 may authorize a third party to perform transaction processing on its behalf. In this case, the point-of-sale terminal will be configured to communicate with the third party. Such a third party is usually called a "merchant processor," an "acquiring processor," or a "third party processor."

Using an interchange network 28, computers of merchant bank 26 or merchant processor will communicate with computers of an issuer bank 30 to determine whether the alleged cardholder is actually legitimate cardholder 22 (i.e., authentication), whether cardholder's 22 account 32 is in good standing, and whether the purchase is covered by cardholder's 22 available credit line. Based on these determinations, the requests for authentication and authorization will be declined or accepted. Authentication may be performed prior to authorization. If the requests are accepted, an authorization code is issued to merchant 24.

In the exemplary embodiment, the payment card system 20 includes or is in communication with a parallel hybrid model analysis (PHMA) server 34. In this embodiment, the PHMA platform 34 provides enhanced analysis of transactions, where the analysis is enhanced using the parallel hybrid model analysis described herein. The PHMA platform 34 uses historical transactions to build a plurality of models. The models include at least two different styles of models, such as, but not limited to, k-clustering models and supervised learning models as described herein. In the exemplary embodiment, the PHMA platform 34 may receive historical data from one or more of the acquirer bank 26, the interchange network 28, and the issuer 30. The historical data may include messages and/or transaction data associated with a plurality of PANs, other historical data associated with the plurality of PANs, etc. The historical data may be associated with both card present and card not present historical transactions. For example, the historical data may include cardholder shipping address, cardholder billing address, cardholder email address, cardholder phone number, merchant name, merchant category, merchant location, and/or at least one environment-related variable (e.g., device details, browser details) including device ID, IP address, device channel, etc. Further, the historical data may be stored in a database accessible by PHMA platform 34 and operated by an interchange network 28. In some embodiments, the historical data will be hashed prior to storing to protect the security of this personally identifiable information.

When a request for authorization is accepted, the available credit line of cardholder's 22 account 32 is decreased. Normally, a charge for a payment card transaction is not posted immediately to cardholder's 22 account 32 because bankcard associations, such as Mastercard International Incorporated®, have promulgated rules that do not allow merchant 24 to charge, or "capture," a transaction until products are shipped or services are delivered. However, with respect to at least some debit card transactions, a charge may be posted at the time of the transaction. When merchant 24 ships or delivers the products or services, merchant 24 captures the transaction by, for example, appropriate data entry procedures on the point-of-sale terminal. This may include bundling of approved transactions daily for standard retail purchases. If cardholder 22 cancels a transaction before it is captured, a "void" is generated. If cardholder 22 returns products after the transaction has been captured, a "credit" is generated. Interchange network 28 and/or issuer bank 30 stores the transaction card information, such as a type of merchant, amount of purchase, date of purchase, in a database 220 (shown in FIG. 2).

After a purchase has been made, a clearing process occurs to transfer additional transaction data related to the purchase among the parties to the transaction, such as merchant bank 26, interchange network 28, and issuer bank 30. More specifically, during and/or after the clearing process, additional data, such as a time of purchase, a merchant name, a type of merchant, purchase information, cardholder account information, a type of transaction, information regarding the purchased item and/or service, and/or other suitable information, is associated with a transaction and transmitted between parties to the transaction as transaction data, and may be stored by any of the parties to the transaction. After a transaction is authorized and cleared, the transaction is settled among merchant 24, merchant bank 26, and issuer bank 30. Settlement refers to the transfer of financial data or funds among merchant's 24 account, merchant bank 26, and issuer bank 30 related to the transaction. Usually, transactions are captured and accumulated into a "batch," which is settled as a group. More specifically, a transaction may be settled between issuer bank 30 and interchange network 28, and then between interchange network 28 and merchant bank 26, and then between merchant bank 26 and merchant 24.

As described below in more detail, parallel hybrid model analysis (PHMA) may be performed by the PHMA platform 34 on behalf of an access control server (ACS) or issuer bank 30 in the context of multi-party payment card system 20. Although the systems described herein are not intended to be limited to facilitate such applications, the systems are described as such for example purposes.

Figure 2:
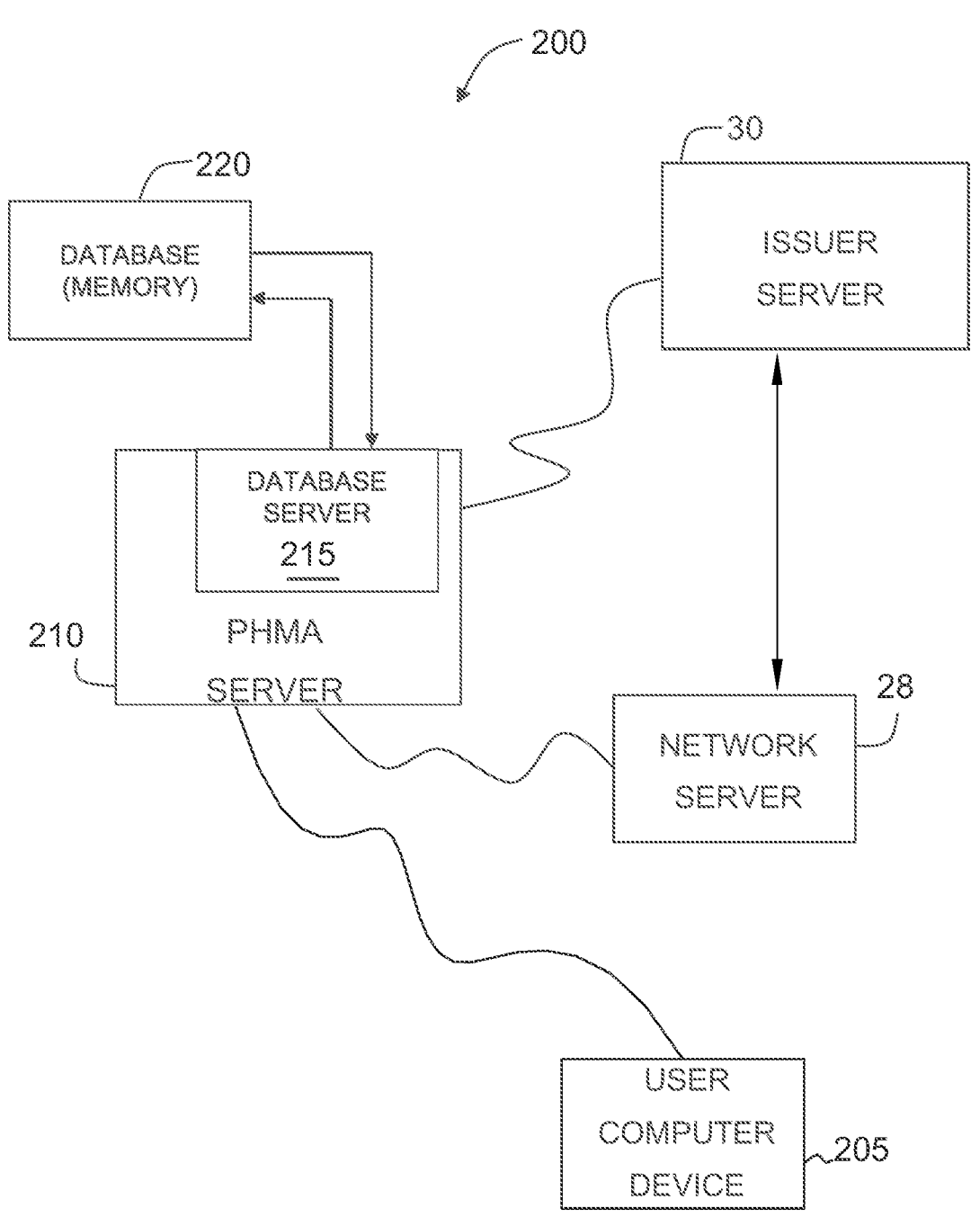

FIG. 2 is an expanded block diagram of an example embodiment of a computer system 200 used in parallel hybrid model analysis. In the exemplary embodiment, system 200 may be used for performing analysis of data using parallel hybrid model analysis as described herein. In at least one embodiment, the system 200 may be used for detecting money laundering. In at least one embodiment, system 200 is in communication with processing system 20 (shown in FIG. 1). In additional embodiments, system 200 is a part of processing system 20.

In the exemplary embodiment, user computer devices 205 are computers that include a web browser or a software application, which enables user computer devices 205 to access remote computer devices, such as PHMA server 210, using the Internet or other network. More specifically, user computer devices 205 may be communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem. User computer devices 205 may be any device capable of accessing the Internet including, but not limited to, a desktop computer, a laptop computer, a personal digital assistant (PDA), a cellular phone, a smartphone, a tablet, a phablet, wearable electronics, smart watch, or other web-based connectable equipment or mobile devices.

In the exemplary embodiment, network server 28 is a computer system used for processing of payment transactions in system 20 (shown in FIG. 1). Network server 28 includes a web browser or a software application, which enables network server 28 to access remote computer devices, such as PHMA server 210, using the Internet or other network. More specifically, network server 28 may be hosted on one or more computers that are communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem. Network server 28 may be any device capable of accessing the Internet including, but not limited to, a desktop computer, a laptop computer, a personal digital assistant (PDA), a cellular phone, a smartphone, a tablet, a phablet, wearable electronics, smart watch, or other web-based connectable equipment or mobile devices.

In the exemplary embodiment, issuer server 30 is a computer system used for the processing of payment transactions in system 20. Issuer server 30 includes a web browser or a software application, which enables issuer server 30 to access remote computer devices, such as PHMA server 210, using the Internet or other network. More specifically, issuer server 30 may be hosted on one or more computers that are communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem. Issuer server 30 may be any device capable of accessing the Internet including, but not limited to, a desktop computer, a laptop computer, a personal digital assistant (PDA), a cellular phone, a smartphone, a tablet, a phablet, wearable electronics, smart watch, or other web-based connectable equipment or mobile devices.

In the exemplary embodiments, parallel hybrid model analysis (PHMA) server 210 analyzes data using parallel hybrid models, such as data from system 20. In some embodiments, the PHMA server 210 is in communication with one or more user computer devices 205. In some embodiments, PHMA server 210 is associated with system 20. In other embodiments, the PHMA server 210 is separate from system 20. In some embodiments, PHMA server 210 is similar to PHMA platform 34 (shown in FIG. 1). In the exemplary embodiment, PHMA server 210 stores a plurality of models including a first model 320 of a first model type 315 and a second model 335 of a second model type 330 (all shown in FIG. 3). The first model type 315 and the second model type 330 are different. The PHMA server 210 receives at least one data record 305 (shown in FIG. 3) to be analyzed. The PHMA server 210 executes the first model 320 with the at least one data record 305 as an input to receive one or more weight values 345 as output 350 (both shown in FIG. 3). The PHMA server 210 executes the second model 335 with the at least one data record 305 as an input to receive a partial score 345 as output 350. The PHMA server 210 combines the one or more weight values with the partial score to generate a final score 345. The PHMA server 210 analyze the final score 345 to determine if one or more alerts 350 should be electronically transmitted to a user device 205, as described further herein.

In the exemplary embodiments, PHMA servers 210 are computers that include a web browser or a software application, which allow for communication with a plurality of user computer devices 205, using the Internet or other network. More specifically, PHMA servers 210 may be communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem. PHMA servers 210 may be any device capable of accessing the Internet including, but not limited to, a desktop computer, a laptop computer, a personal digital assistant (PDA), a cellular phone, a smartphone, a tablet, a phablet, wearable electronics, smart watch, or other web-based connectable equipment or mobile devices.

A database server 215 is connected to database 220. In one embodiment, centralized database 220 is stored on the PHMA server 210 and can be accessed by potential users at one of user computing devices 205 by logging onto PHMA server 210 through one or more client systems. In an alternative embodiment, database 220 is stored remotely from PHMA server 210 and may be non-centralized. Database 220 may be a database configured to store information including, for example, weights associated with one or more clusters historical transaction data, including both credit and debit transactions.

Database 220 may include a single database having separated sections or partitions, or may include multiple databases, each being separate from each other. Database 220 may store transaction data generated over a computer network, such as the processing system 20 including data relating to merchants, consumers, account holders, prospective customers, issuers, acquirers, and/or purchases made.

Figure 3:
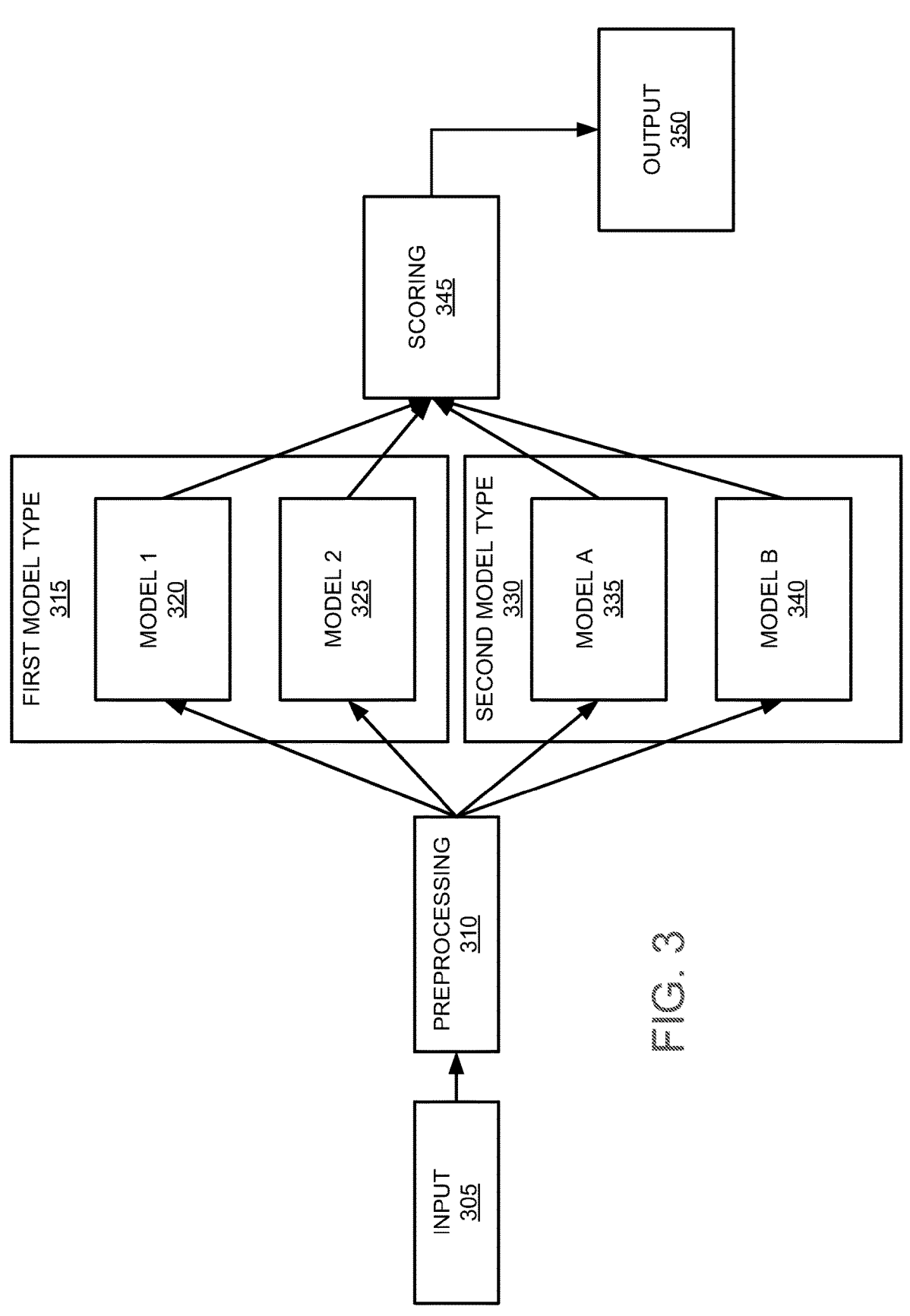

FIG. 3 illustrates a flow diagram of an example process 300 of analyzing data using parallel hybrid model analysis implemented using the system 200 (shown in FIG. 2). As explained further below, in one embodiment, process 300 may be used for analyzing transactions to detect money laundering. In the exemplary embodiment, the steps of process 300 are performed by the PHMA server 210 (shown in FIG. 2).

In the exemplary embodiment, process 300 described herein includes using multiple models in parallel to analyze data and then determine the final results based on combining the results of the different models. This allows the parallel hybrid model analysis (PHMA) system 200 to analyze data from large collections of records and compare that analysis to new records. In some embodiments, the historical records are used to train the models and the new records (e.g., model input variables) are analyzed using those models to determine results in real-time. Furthermore, as described herein, the patterns of data may change over time, so the new records are also used to update the models (e.g., re-train the models) for use with future records that need to be analyzed.

In the exemplary embodiment, the PHMA server 210 receives input 305 as data records that may include, but are not limited to, messages, images, financial transactions, and/or any other type of data record. The PHMA server 210 preprocesses 310 the input 305 to determine some or all of the parameters and attributes of the data record. Furthermore, the PHMA server 210 preprocesses 310 the data records to be formatted to be routed to and used by the models.

In the exemplary embodiment, at least two different types of models are used in the plurality of models. In the exemplary embodiment, the first model type 315 is a cluster model, such as, but not limited to a k-means clustering model. The second model type 330 is a supervised learning neural network model, such as, but not limited to, one trained with a multilayer perceptron algorithm or other feed forward algorithms. In other embodiments, other models may be used in this system.

In the exemplary embodiment, there are two models 320 and 325 of the first model type 315 (e.g., cluster model type). These two models 320 and 325 are each associated with one option of a two-option parameter of the data records to be analyzed, where the first model 320 of the first model type 315 is trained with data records that have the first parameter option and the second model 325 of the first model type 315 is trained with data records that have the second parameter option. For example, if the models are being applied to a message as the data record 305, the parameter option could be if the message was transmitted or receive. In an example where an image is the data record 305, the parameter option could be if the image is an inside (e.g., inside a building) or an outside (e.g., outside a building) image. In a transaction example, the parameter option could be if the transaction is a debit transaction or a credit transaction. These above examples are provided for illustration and are not intended to limit this disclosure in any way. Furthermore, in some embodiments, there may be three or more models of the first model type 315 where each of the three or more models is for a different selection of the parameter.

In the exemplary embodiment, there are also two models 335 and 340 of the second model type 330. These two models 335 and 340 are each associated with one or more parameters of the data records to be analyzed, where the first model 335 of the second model type 330 is trained with data records that have its selected parameters and the second model 340 of the second model type 330 is trained with data records that have its selected parameters. In some embodiments, the selected parameters are the same for the two models 335 and 340, but have different options selected. In other embodiments, the selected parameters are different for the two models 335 and 340. In the message example from above, the parameter could be if the message was a specific message type. In the image example from above, the parameter could be if the image includes one or more desired objects, such as a table or a person. In the transaction example from above, the parameter could be based upon the transaction type. These above examples are provided for illustration and are not intended to limit the disclosure in anyway. Furthermore, in some embodiments, there may be three or more models of the second model type 330 where each of the three or more models is for a different selection of the parameter or for a different parameter.

In the exemplary embodiment, the PHMA server 210 receives a data record 305 to be analyzed, such as, but not limited to, a message, an image, a transaction, and/or any other data record. In some embodiments, the PHMA server 210 receives, analyzes, and reports on the data record 305 in real-time. The PHMA system determines which models to execute with the data record. The PHMA server 210 determines which 310 option has been selected on the parameter(s) associated with the first model type 315. Then the PHMA server 210 executes the model 320 or 325 associated with that option using the data record 305 as input. In the exemplary embodiment, the first model type 315 includes clustering models. Accordingly, the model 320 or 325 assigns the data record 305 to a cluster and reports the cluster to the PHMA server 210. In the exemplary embodiment, each cluster is assigned a weight and the PHMA server 210 uses that weight in generating a score 345 for the data record 305.

The PHMA server 210 also determines which models 335 or 340 of the second model type 330 to execute with the data record 305 based upon the associated parameters and those parameter values. The PHMA server 210 then executes the selected model(s) 335 or 340 with the data record 305 as an input. The executed model(s) 320 or 325 output one or more partial scores and/or weights for the data record 305. The PHMA server 210 uses the one or more partial scores and/or weights in generating a score 345 for the data record 305. In the exemplary embodiment, the output from the model 320 or 325 of the first model type 315 and the output from the model(s) 335 and/or 345 of the second model type 330 are combined to generate a score 345 for the data record 305.

In at least one embodiment, the generated score 345 from the outputs of the models is a raw score. In this embodiment, the PHMA server 210 generates a final score via a sigmoid function so that the final score is between 0 to 1, but any scoring range could be used.

In some embodiments, in addition to training the models, the PHMA server 210 also tracks velocities for one or more of the parameters of the data records. The velocities may include exponential decay velocities to account for or more heavily weight the more current data in comparison to older data. This may be done to allow the PHMA server 210 to detect current patterns.

In some further embodiments, the PHMA server 210 generates a reason code to explain why the system 200 scored 345 the data record 305 the way that it did. This allows for additional and more nuanced information to be provided to the user. The reason code assignment is independent from the score. The PHMA server 210 may have a plurality of reason codes that may be assigned based on different results and different reasons for the score 345.

One potential, non-limiting use for the parallel hybrid model system is for detecting patterns in payment transactions that may be indicative of money laundering. For the anti-money laundering implementation, one of the purposes is to detect suspicious accounts that may be potentially committing money laundering. The data records 305 are payment transactions being processed by a payment network 20 (shown in FIG. 1). For this implementation, the first model type 315 is K-means clustering models. There are two models 320 and 325 of the first model type 315. The first model 320 is for credit transactions. The second model 325 is for debit and/or prepaid transactions. The first and second models 320 and 325 are trained to cluster the payment transaction based upon how risky the payment transaction is. In other words, how likely the transaction is associated with or part of a money laundering scheme. If it is determined that there is a high likelihood that a particular transaction is part of a money laundering scheme, then that particular transaction is considered high risk. If the payment transaction is assigned to a high-risk cluster, then the raw score is amplified. If the payment transaction is assigned to low-risk cluster, then the raw score is attenuated.

For the anti-money laundering implementation, the second model type 330 is a supervised learning trained neural network model using the multilayer perceptron algorithm. In this implementation, the first model 335 of the second model type 330 is for ATM (automated teller machine) transactions. The second model 340 of the second model type 330 is for money-send transactions. Money-send transactions are for real-time money transfers by issuers connected to the payment network.

The PHMA server 210 receives any scores from the models 335 and/or 340 of the second model type 330 and the assigned cluster IDs from the model of the first model type 315. The PHMA server 210 determines the weight(s) associated with the cluster ID and modifies the scores with those weights to determine the raw score. The scoring consists of two formulas. The first one calculates the raw score. The first formula consists of high-risk and low-risk factors and applies and equation to those factors to calculate the raw score. The high-risk factors amplify the raw score, while the low-risk factors attenuate the raw score. In at least one embodiment, the range of the output depends on the dataset that the formula is applied to. In at least one embodiment, the risk factors are based upon some exponential-decay velocities with a 56-day decay rate and associated with the account associated with the payment transaction.

where 5000 in the denominator can be changed to any constant value. It adjusts the sensitivity of the raw score to a threshold for observing high-risk activity. Based on Equation 2, cluster_w is the weight of the assigned cluster to the transaction by the clustering model, and product_weight is the weight of the card type. For example, a prepaid card transaction has a larger weight compared to a credit card transaction, and credit card transaction has a larger weight than world-elite credit card transaction.

This expands to the equation for factors.

$$Hiusd\_factor = \qquad\qquad\qquad EQ.\ 3$$
$$1.0 + 1.15 * de2\_card\_nbr\_anr\_hi\_usd\_ind\_dec56day/$$
$$(de2\_card\_nbr\_app\_nrvs\_dec56day + 20)$$

where risk_usd2 is the summation of the high-risk velocities with their individual coefficients.

$$Risk\_usd2 = \qquad\qquad\qquad EQ.\ 4$$
$$POWER((de2\_card\_nbr\_anr\_usd\_xbr\_lfi\_dec56day * 0.05), 2.0) +$$
$$POWER(de2\_card\_nbr\_anr\_usd\_mcc\_g1g2\_dec56day, 2.0) +$$
$$POWER((de2\_card\_nbr\_anr\_usd\_mcc\_g3\_dec56day * 0.7), 2.0) +$$
$$POWER((de2\_card\_nbr\_anr\_usd\_mcc\_g4\_dec56day * 0.8), 2.0) +$$
$$POWER((de2\_card\_nbr\_anr\_usd\_mcc\_g5\_dec56day * 1.0), 2.0) +$$

TABLE 1

| Velocity name | Description |
| --- | --- |
| de2_card_nbr_anr_usd_xbr_lfi_dec56day | approved USD of cross-border transactions of the PAN that at least one of the involved countries is among the high-risk countries |
| de2_card_nbr_anr_usd_mcc_g1g2_dec56day | approved USD of money-send transactions |
| de2_card_nbr_anr_usd_mcc_g3_dec56day | approved USD of transactions with a unique/luxury type of MCC |
| de2_card_nbr_anr_usd_mcc_g4_dec56day | approved USD of transactions with a financial type of merchant category code (MCC) |
| de2_card_nbr_anr_usd_mcc_g5_dec56day | approved USD of gambling |
| de2_card_nbr_anr_usd_atm_ind_dec56day | approved USD ATM |
| de2_card_nbr_anr_usd_xbr_dec56day | approved USD of cross-border transactions |
| de2_card_nbr_anr_usd_refund_ind_dec56day | approved USD of refund transactions |
| de2_card_nbr_anr_hi_usd_ind_dec56day | counter of approved transactions with USD >= $200 |
| de2_card_nbr_app_nrvs_dec56day | counter of approved transactions |
| de2_card_nbr_anr_usd_dec56day | approved USD of the transactions |
| de2_card_nbr_anr_usd_safe_mcc_dec56day | approved USD of transactions against merchants with an MCC among the MCCs considered as safe MCCs |

In the anti-money laundering embodiment, an example raw score formula may include:

$$raw\_score = cluster\_w * product\_weight * hiusd\_factor * \qquad EQ.\ 2$$
$$(risk\_usd2 + refund\_usd2 + remainder * remainder - interaction)/$$
$$(usd + 5000)$$

-continued
$$POWER((de2\_card\_nbr\_anr\_usd\_atm\_ind\_dec56day * 1.0), 2.0) +$$
$$POWER((de2\_card\_nbr\_anr\_usd\_xbr\_dec56day * 0.001), 2.0)$$

which can be generalized to:

$$risk\_usd2 = \sum (Vi * Ci)^2 \qquad\qquad EQ.\ 5$$

17 where Vi is the high-risk velocity of index i and Ci is its coefficient. Then $$usd = de2\_card\_nrb\_anr\_usd\_dec56day + \qquad \text{EQ. 6}$$
$$2 * ABS(de2\_card\_nbr\_anr\_usd\_refund\_ind\_dec56day)$$

$$remainder = 0.2 * (usd - safe\_usd - (risk\_usd + refund\_usd)) \qquad \text{EQ. 7}$$

where safe_mcc equals de2_card_nbr_anr_usd_safe_mcc_dec56 day and the risk_usd is similar to risk_usd2 but without squaring.

$$Risk\_usd = \qquad \text{EQ. 8}$$
$$ABS(de2\_card\_nbr\_anr\_usd\_xbr\_lfi\_dec56day * 0.05) +$$

18

-continued $$ABS(de2\_card\_nbr\_anr\_usd\_mcc\_g1g2\_dec56day) +$$
$$ABS(de2\_card\_nbr\_anr\_usd\_mcc\_g3\_dec56day * 0.7) +$$
$$ABS(de2\_card\_nbr\_anr\_usd\_mcc\_g4\_dec56day * 0.8) +$$
$$ABS(de2\_card\_nbr\_anr\_usd\_mcc\_g5\_dec56day * 1.0) +$$
$$ABS(de2\_card\_nbr\_anr\_usd\_atm\_ind\_dec56day * 1.0) +$$
$$ABS(de2\_card\_nbr\_anr\_usd\_xbr\_dec56day * 0.001)$$

where refund_usd is ABS(de2_card_nbr_anr_usd_refund_ind_dec56 day). Interaction is the summation of the product of multiplying each combination of high-risk factors.

$$Interaction = ABS(refund\_usd * remainder * 7.5) + \qquad \text{EQ. 9}$$
$$ABS(refund\_usd * safe\_usd * 2) + ABS(refund\_usd *$$
$$de2\_card\_nbr\_anr\_usd\_mcc\_g1g2\_dec56day * 0.5) +$$
$$ABS(refund\_usd * de2\_card\_nbr\_anr\_usd\_mcc\_g3\_dec56day * 0.9) +$$
$$ABS(refund\_usd * de2\_card\_nbr\_anr\_usd\_mcc\_g4\_dec56day * 0.7) +$$
$$ABS(refund\_usd * de2\_card\_nbr\_anr\_usd\_mcc\_g5\_dec56day * 0.7) +$$
$$ABS(refund\_usd * de2\_card\_nbr\_anr\_usd\_atm\_ind\_dec56day * 0.5) +$$
$$ABS(remainder * safe\_usd * 15) + ABS(remainder *$$
$$de2\_card\_nbr\_anr\_usd\_mcc\_g1g2\_dec56day * 3.75) +$$
$$ABS(remainder * de2\_card\_nbr\_anr\_usd\_mcc\_g3\_dec56day * 6.75) +$$
$$ABS(remainder * de2\_card\_nbr\_anr\_usd\_mcc\_g4\_dec56day * 5.25) +$$
$$ABS(remainder * de2\_card\_nbr\_anr\_usd\_mcc\_g5\_dec56day * 5.25) +$$
$$ABS(remainder * de2\_card\_nbr\_anr\_usd\_atm\_ind\_dec56day * 3.75) +$$
$$ABS(safe\_usd * de2\_card\_nbr\_anr\_usd\_mcc\_g1g2\_dec56day) +$$
$$ABS(safe\_usd * de2\_card\_nbr\_anr\_usd\_mcc\_g3\_dec56day * 1.8) +$$
$$ABS(safe\_usd * de2\_card\_nbr\_anr\_usd\_mcc\_g4\_dec56day * 1.4) +$$
$$ABS(safe\_usd * de2\_card\_nbr\_anr\_usd\_mcc\_g5\_dec56day * 1.4) +$$
$$ABS(safe\_usd * de2\_card\_nbr\_anr\_usd\_atm\_ind\_dec56day) +$$
$$ABS(de2\_card\_nbr\_anr\_usd\_mcc\_g1g2\_dec56day *$$
$$de2\_card\_nbr\_anr\_usd\_mcc\_g3\_dec56day * 0.45) +$$
$$ABS(de2\_card\_nbr\_anr\_usd\_mcc\_g1g2\_dec56day *$$
$$de2\_card\_nbr\_anr\_usd\_mcc\_g4\_dec56day * 0.35) +$$
$$ABS(de2\_card\_nbr\_anr\_usd\_mcc\_g1g2\_dec56day *$$
$$de2\_card\_nbr\_anr\_usd\_mcc\_g5\_dec56day * 0.35) +$$
$$ABS(de2\_card\_nbr\_anr\_usd\_mcc\_g1g2\_dec56day *$$
$$de2\_card\_nbr\_anr\_usd\_atm\_ind\_dec56day * 0.25) +$$
$$ABS(de2\_card\_nbr\_anr\_usd\_mcc\_g3\_dec56day *$$
$$de2\_card\_nbr\_anr\_usd\_mcc\_g4\_dec56day *$$
$$0.63) + ABS(de2\_card\_nbr\_anr\_usd\_mcc\_g3\_dec56day *$$
$$de2\_card\_nbr\_anr\_usd\_mcc\_g5\_dec56day * 0.63) +$$

-continued $$ABS(de2\_card\_nbr\_anr\_usd\_mcc\_g3\_dec56day *$$

$$de2\_card\_nbr\_anr\_usd\_atm\_ind\_dec56day *$$

$$0.45) + ABS(de2\_card\_nbr\_anr\_usd\_mcc\_g4\_dec56day *$$

$$de2\_card\_nbr\_anr\_usd\_mcc\_g5\_dec56day * 0.49) +$$

$$ABS(de2\_card\_nbr\_anr\_usd\_mcc\_g4\_dec56day *$$

$$de2\_card\_nbr\_anr\_usd\_atm\_ind\_dec56day * 0.35) +$$

$$ABS(de2\_card\_nbr\_anr\_usd\_mcc\_g5\_dec56day *$$

$$de2\_card\_nbr\_anr\_usd\_atm\_ind\_dec56day * 0.35)$$

This can be generalized as:

$$interaction - \sum\sum ABS(Vi * Vj * Cij) \qquad \text{EQ. 10}$$

The product of the raw score formula goes to a secondary equation to transform the raw score to the final score. The range of raw score can vary. But the range of final score is 0 to 1. The secondary formula is a sigmoid function:

$$score = 1/(1 + EXP(-1 * 0.0018 * \qquad \text{EQ. 11}$$

$$(POWER(raw\_score, 0.65) - 558.9163397)))$$

which can be generalized as EQ. 1.

$$Score = 1/(1 + EXP(-c * (raw\_score^p - a))) \qquad \text{EQ. 1}$$

In the anti-money-laundering implementation, a reason code is calculated to allow the user to know the main reason why the account associated with the transaction is flagged as being associated with a money laundering scheme. In this implementation, the reason code assignment is determined independently from the score. In this implementation, there are seven reason codes. Six of the reason codes are specific to anti-money laundering typology groups. One of the reason codes indicates an abnormal amount of U.S. dollars.

For the purpose of this implementation, each typology group has its own transaction velocity, which is a high-risk velocity. The PHMA system then calculates the appropriate reason code from the velocities and the payment transaction. The combination assignment logic can be summed up to all_comps. In this case, the transaction velocity for each of the reason code categories using an exponential decay velocity for transactions of the corresponding type for the last 56 days.

$$All\_comps = \qquad \text{EQ. 12}$$

$$refund\_usd + de2\_card\_nbr\_anr\_usd\_mcc\_g1g2\_dec56day +$$

$$de2\_card\_nbr\_anr\_usd\_mcc\_g3\_dec56day +$$

$$de2\_card\_nbr\_anr\_usd\_mcc\_g4\_dec56day +$$

$$de2\_card\_nbr\_anr\_usd\_mcc\_g5\_dec56day +$$

$$de2\_card\_nbr\_anr\_usd\_atm\_ind\_dec56day + 0.2 * remainder$$

where $$cmp\_mcc\_g1g2 = \qquad \text{EQ. 13}$$

$$de2\_card\_nbr\_anr\_usd\_mcc\_g1g2\_dec56day/all\_comps$$

$$cmp\_mcc\_g3 = \qquad \text{EQ. 14}$$

$$de2\_card\_nbr\_anr\_usd\_mcc\_g3\_dec56day/all\_comps$$

$$cmp\_mcc\_g4 = \qquad \text{EQ. 15}$$

$$de2\_card\_nbr\_anr\_usd\_mcc\_g4\_dec56day/all\_comps$$

$$cmp\_mcc\_g5 = \qquad \text{EQ. 16}$$

$$de2\_card\_nbr\_anr\_usd\_mcc\_g5\_dec56day/all\_comps$$

$$cmp\_atm = de2\_card\_nbr\_anr\_usd\_atm\_ind\_dec56day/all\_comps \qquad \text{EQ. 17}$$

$$cmp\_remainder = remainder/all\_comps \qquad \text{EQ. 18}$$

$$cmp\_refund = refund\_usd/all\_comps \qquad \text{EQ. 19}$$

The PHMA server 210 then uses the values to determine the reason code. In this implementation, the final score and the reason code are returned to the user. For example, the score and the reason code may be returned to the network 28 and/or issuer 30 (both shown in FIG. 1) associated with the payment transaction or ATM transaction or any other type of transaction that may include money laundering schemes. The score and reason code may also be transmitted to other individuals. In some embodiments, when the score exceeds one or more thresholds, the PHMA system generates and transmits one or more alerts and/or notifications.

In some embodiments, the PHMA system automatically triggers an investigation. In some of these embodiments, the PHMA system assigns one or more investigators to the investigation and transmits notifications to the one or more investigators. The PHMA system may also transmit information from the analysis that cause the PHMA system to determine that there may be indicators or money laundering and/or any other malicious actions. The PHMA system may also allocate additional computing resources to handle the investigation.

In some further embodiments, the PHMA system analyzes the generated score and/or reason code(s) to determine the next actions that the PHMA system should initiate. In some situations, the PHMA system determines that additional data points are needed for analysis. In these situations, the PHMA system may store the analysis to be re-run at a subsequent time with more data points. The PHMA system may also allocate additional computing resources to handle the follow-up analysis.

In situations, where the suspicious activity occurs at one or more ATMs (automated teller machines), the PHMA system may isolate those ATMs. The PHMA system may request camera information from the ATMs at times where the suspicious activity occurs. The PHMA system may also notify the businesses and/or banks associated with those ATMs to notify them of the suspicious behavior. The PHMA system may also initiate diagnostic code on the ATM to determine if the ATM has been tampered with. The PHMA system may also remotely restart the ATM to clear any issues that may have been added to the ATM's cache.

The PHMA system may also take other actions depending upon the reason code. For example, the PHMA system flags one or more of the PAN, the ATM operator, and/or the issuer bank. The PHMA system then deploys additional computer resources to address future transactions and to mitigate the likelihood of further money laundering transactions from happing in the future. The additional computer resources include fraud detection resources to allow for more fraud modeling in real time. In other embodiments, the PHMA system implements one-time passwords or biometrics to be used for future transactions. Accordingly, the PHMA system deploys more computer resources to handle the biometric checks in real time on these flagged transactions.

For credit or debit transactions, the PHMA system may take one or more of the above actions to mitigate fraud and to reduce the potential for money-laundering activity. These actions may include, but are not limited to shutting down the POS device, preventing the merchant from processing trans-actions, re-starting the devices remotely, using diagnostic checks to fix any problems with POS, and/or deploy more computers to address future transactions from that merchant or acquirer or involving that issuer cards.

Figure 4:
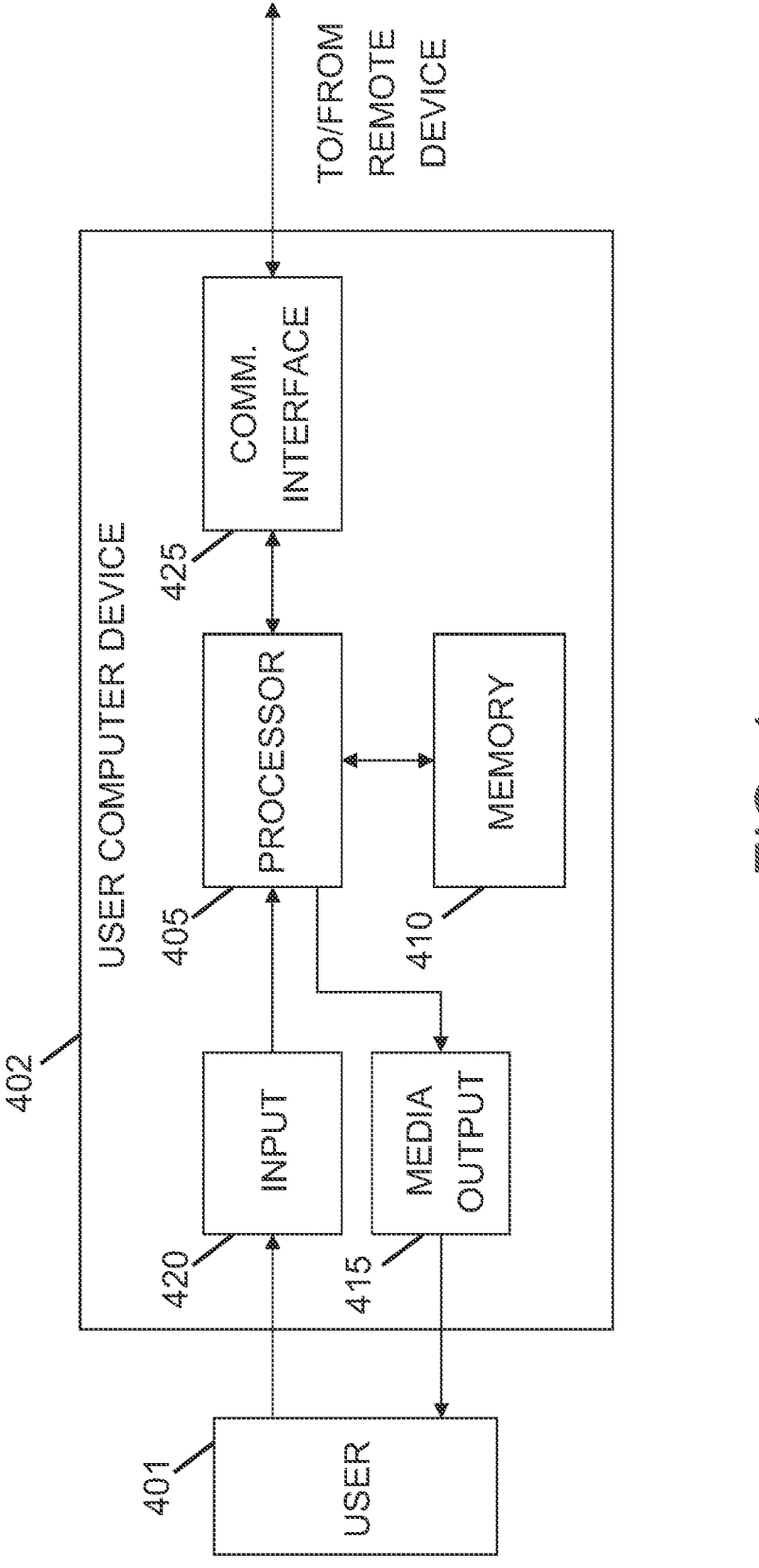

FIG. 4 illustrates an example configuration of a user computing device 402. User computing device 402 may include, but is not limited to, user computer device 205 (shown in FIG. 2). User computing device 402 includes a processor 405 for executing instructions. In some embodi-ments, executable instructions are stored in a memory area 410. Processor 405 may include one or more processing units (e.g., in a multi-core configuration). Memory area 410 is any device allowing information such as executable instructions and/or other data to be stored and retrieved. Memory area 410 may include one or more computer-readable media.

User computing device 402 also includes at least one media output component 415 for presenting information to a user 400. Media output component 415 is any component capable of conveying information to user 400. In some embodiments, media output component 415 includes an output adapter such as a video adapter and/or an audio adapter. An output adapter is operatively coupled to proces-sor 405 and operatively couplable to an output device such as a display device (e.g., a cathode ray tube (CRT), liquid crystal display (LCD), light emitting diode (LED) display, or "electronic ink" display) or an audio output device (e.g., a speaker or headphones).

In some embodiments, user computing device 402 includes an input device 420 for receiving input from user 401. Input device 420 may include, for example, a keyboard, a pointing device, a mouse, a stylus, a touch sensitive panel (e.g., a touch pad or a touch screen), a camera, a gyroscope, an accelerometer, a position detector, and/or an audio input device. A single component such as a touch screen may function as both an output device of media output compo-nent 415 and input device 420.

User computing device 402 may also include a commu-nication interface 425, which is communicatively couplable to a remote device such as PHMA server 210 (shown in FIG. 2). Communication interface 425 may include, for example, a wired or wireless network adapter or a wireless data transceiver for use with a mobile phone network (e.g., Global System for Mobile communications (GSM), 3G, 4G or Bluetooth) or other mobile data network (e.g., Worldwide Interoperability for Microwave Access (WIMAX)).

Stored in memory area 410 are, for example, computer readable instructions for providing a user interface to user 401 via media output component 415 and, optionally, receiv-ing and processing input from input device 420. A user interface may include, among other possibilities, a web browser and/or a client application. Web browsers enable users, such as user 401, to display and interact with media and other information typically embedded on a web page or a website from PHMA server 210. A client application allows user 401 to interact with, for example, message traffic and/or transaction reports. For example, instructions may be stored by a cloud service, and the output of the execution of the instructions sent to the media output component 415.

Processor 405 executes computer-executable instructions for implementing aspects of the disclosure. In some embodi-ments, the processor 405 is transformed into a special purpose microprocessor by executing computer-executable instructions or by otherwise being programmed.

Figure 5:
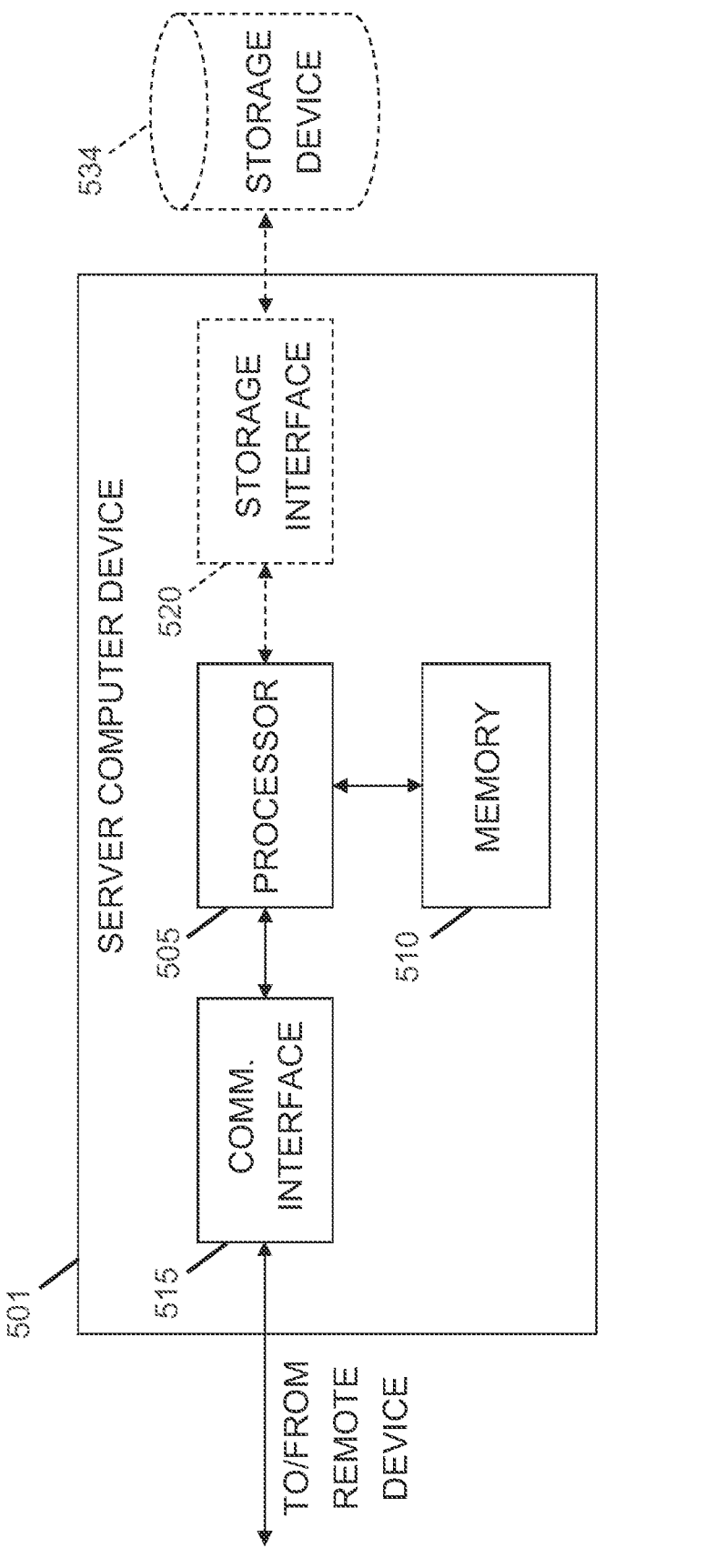

FIG. 5 illustrates an example configuration of a server system 301 such as PHMA platform 34 (shown in FIG. 1), in accordance with one example embodiment of the present disclosure. Server system 501 may also include, but is not limited to, PHMA platform 34 (shown in FIG. 1), PHMA server 210, and database server 215 (both shown in FIG. 2). In the example embodiment, server system 501 determines and analyzes patterns in transactions, as described herein.

Server system 501 includes a processor 505 for executing instructions. Instructions may be stored in a memory area 510, for example. Processor 505 may include one or more processing units (e.g., in a multi-core configuration) for executing instructions. The instructions may be executed within a variety of different operating systems on the server system 501, such as UNIX, LINUX, Microsoft Windows®, etc. It should also be appreciated that upon initiation of a computer-based method, various instructions may be executed during initialization. Some operations may be required in order to perform one or more processes described herein, while other operations may be more gen-eral and/or specific to a particular programming language (e.g., C, C #, C++, Java, or other suitable programming languages, etc.).

Processor 505 is operatively coupled to a communication interface 515 such that server system 501 is capable of communicating with a remote device such as a user system or another server system 501. For example, communication interface 515 may receive requests from a user computer device 205 via the Internet, as illustrated in FIG. 2.

Processor 505 may also be operatively coupled to a storage device 534. Storage device 534 is any computer-operated hardware suitable for storing and/or retrieving data. In some embodiments, storage device 534 is integrated in server system 501. For example, server system 501 may include one or more hard disk drives as storage device 534. In other embodiments, storage device 534 is external to server system 501 and may be accessed by a plurality of server systems 501. For example, storage device 534 may include multiple storage units such as hard disks or solid state disks in a redundant array of inexpensive disks (RAID)

configuration. Storage device 534 may include a storage area network (SAN) and/or a network attached storage (NAS) system.

In some embodiments, processor 505 is operatively coupled to storage device 534 via a storage interface 520. Storage interface 520 is any component capable of providing processor 505 with access to storage device 534. Storage interface 520 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 505 with access to storage device 534.

Memory area 510 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are examples only, and are thus not limiting as to the types of memory usable for storage of a computer program.

Figure 6:
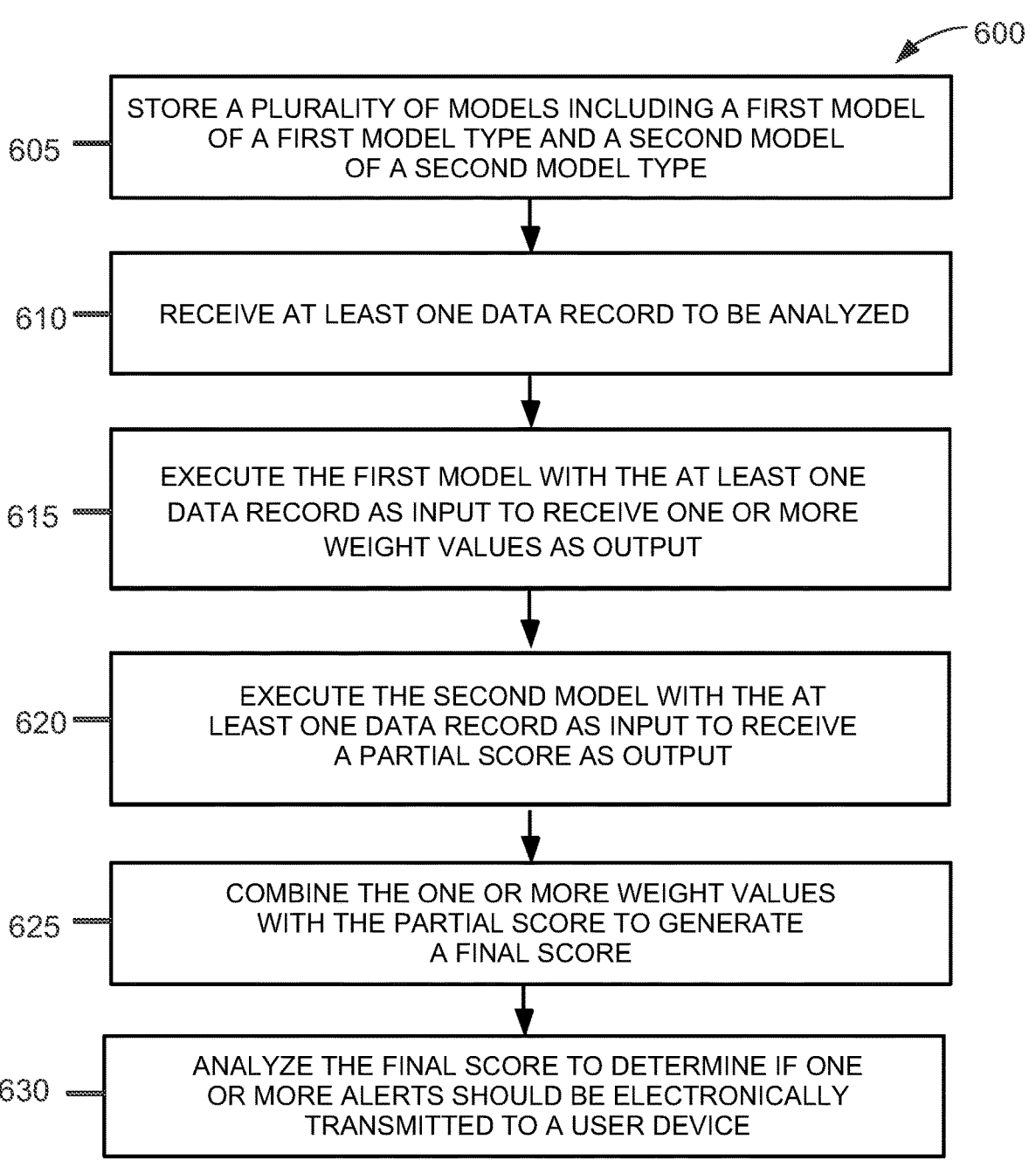

FIG. 6 is a flow diagram of an example process 600 for parallel hybrid models using the PHMA system 200 (shown in FIG. 2). In the exemplary embodiment, process 600 is performed by the PHMA server 210 (shown in FIG. 2).

In the exemplary embodiment, the PHMA server 210 stores 605 a plurality of models including a first model 320 of a first model type 315 and a second model 335 of a second model type 330 (all shown in FIG. 3). The first model type 315 and a second model type 330 are different. In at least one embodiment, the first model type 315 is a K-means clustering model. In at least one embodiment, the second model type 330 is trained using a multilayer perception algorithm via supervised machine learning.

The PHMA server 210 receives 610 at least one data record 305 (shown in FIG. 3) to be analyzed.

The PHMA server 210 executes 615 the first model 320 with the at least one data record 305 as an input to receive one or more weight values as output. In at least one embodiment, the one or more weight values are based upon which cluster the at least one data record 305 is assigned to.

The PHMA server 210 executes 620 the second model 335 with the at least one data record 305 as an input to receive a partial score as output.

The PHMA server 210 combines 625 the one or more weight values with the partial score to generate a final score 345 (shown in FIG. 3). To combine 625 the one or more weight values with the partial score to generate a final score the PHMA server 210 executes a sigmoid function, such as EQ. 1.

The PHMA server 210 analyze 630 the final score to determine if one or more alerts 350 (shown in FIG. 3) should be electronically transmitted to a user device 205 (shown in FIG. 2).

In some embodiments, the PHMA server 210 stores a third model 325 (shown in FIG. 3) of the first model type 315. The PHMA server 210 determines which model of the first model 320 and the third model 325 to execute based on a first attribute of the at least one data record 305. In some embodiments, the first attribute is a binary attribute.

In other embodiments, the PHMA server 210 stores a fourth model 340 (shown in FIG. 3) of the second model type 330. The PHMA server 210 determines whether to execute the second model 335 or the fourth model 340 based upon one or more attributes of the at least one data record 305.

In further embodiments, the PHMA server 210 determines a reason code for the final score based at least in part upon the one or more weight values.

In at least one embodiment, the at least one data record 305 is a payment transaction, and the system 200 is trained to detect a potential money laundering scheme that includes the at least one data record 305.

While the above describes the parallel hybrid model analysis system being used for an anti-money laundering implementation, one having skill in the art would understand that other implementations may be used as well. For a non-limited example, the parallel hybrid model analysis system may be used to analyze and classify multiple types of data records including, but not limited to, message traffic and images to determine one or more other trends and/or patterns. The systems could also be used for analyzing other data records; data that is not necessarily related to money laundering or even financial transactions. The system should not be limited to such applications.

A processor or a processing element may employ artificial intelligence and/or be trained using supervised or unsupervised machine learning, and the machine learning program may employ a neural network, which may be a convolutional neural network, a deep learning neural network, or a combined learning module or program that learns in two or more fields or areas of interest. Machine learning may involve identifying and recognizing patterns in existing data in order to facilitate making predictions for subsequent data. Models may be created based upon example inputs in order to make valid and reliable predictions for novel inputs.

Additionally or alternatively, the machine learning programs may be trained by inputting sample data sets or certain data into the programs, such as image data, text data, report data, and/or numerical analysis. The machine learning programs may utilize deep learning algorithms that may be primarily focused on pattern recognition, and may be trained after processing multiple examples. The machine learning programs may include Bayesian program learning (BPL), voice recognition and synthesis, image or object recognition, optical character recognition, and/or natural language processing-either individually or in combination. The machine learning programs may also include natural language processing, semantic analysis, automatic reasoning, and/or machine learning.

In supervised machine learning, a processing element may be provided with example inputs and their associated outputs, and may seek to discover a general rule that maps inputs to outputs, so that when subsequent novel inputs are provided the processing element may, based upon the discovered rule, accurately predict the correct output. In unsupervised machine learning, the processing element may be required to find its own structure in unlabeled example inputs. In one embodiment, machine learning techniques may be used to extract data about the computer device, the user of the computer device, the computer network hosting the computer device, services executing on the computer device, and/or other data.

Based upon these analyses, the processing element may learn how to identify characteristics and patterns that may then be applied to training models, analyzing transaction and authentication data, and detecting and analyzing fraud probabilities.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

This written description uses examples to disclose the disclosure, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A parallel hybrid model analysis (PHMA) system comprising:

a PHMA server;

a memory device; and at least one processor coupled to the memory device and in communication with the PHMA server, the at least one processor programmed to:

store, at the PHMA server, a plurality of models including a first set of models of a first model type and a second model of a second model type, wherein the first model type is a clustering model type and the second model type is a neural network model type;

receive at least one data record to be analyzed by the plurality of models;

determine, based on one or more parameters of the at least one data record, which model of the first set of models to execute on the at least one data record; and cause the PHMA server to:

execute the determined model of the first set of models with the at least one data record as input to (i) assign the at least one data record to a cluster associated with the determined model, including a cluster ID corresponding to the assigned cluster, and (ii) output one or more weight values associated with the cluster ID assigned to the at least one data record by the determined model, the determined model trained on data records associated with a first parameter option associated with the one or more parameters of the at least one data record;

execute the second model with the at least one data record as input to output a partial score from the second model, the second model trained on data records associated with a second parameter option associated with the one or more parameters of the at least one data record;

modify the partial score by (i) combining the one or more weight values with the partial score and (ii) adjusting a sensitivity of the partial score;

generate a final score based on the modified partial score;

analyze the final score in real-time, including comparing the final score to a score threshold to determine whether to electronically transmit one or more alerts associated with the score threshold to a user device; and based on a determination that the final score satisfies the score threshold, electronically transmit the one or more alerts to the user device.

2. The parallel hybrid model analysis system of claim 1, wherein each model of the first set of models is associated with a respective option of a multi-option parameter of the one or more parameters of the at least one data record, and wherein the at least one processor is further programmed to cause the PHMA server to:

determine, based on the one or more parameters of the at least one data record, which option of the multi-option parameter to associate with the at least one data record.

3. The parallel hybrid model analysis system of claim 2, wherein the at least one processor is further programmed to cause the PHMA server to:

preprocess the at least one data record including determining the one or more parameters of the at least one data record and formatting the at least one data record for input into the plurality of models.

4. The parallel hybrid model analysis system of claim 1, wherein the second model is a second set of models and wherein the at least one processor is further programmed to:

determine which model of the second set of models to execute based on the one or more parameters of the at least one data record.

5. The parallel hybrid model analysis system of claim 1, wherein the clustering model type is a K-means clustering model and the cluster ID is associated with a cluster of the K-means clustering model.

6. The parallel hybrid model analysis system of claim 5, wherein the one or more weight values are based on which cluster of the K-means clustering model the at least one data record is assigned to.

7. The parallel hybrid model analysis system of claim 1, wherein the second model type is trained using a multilayer perception algorithm via supervised machine learning.

8. The parallel hybrid model analysis system of claim 1, wherein to combine the one or more weight values with the partial score to generate a final score the at least one processor is further programmed to execute a sigmoid function.

9. The parallel hybrid model analysis system of claim 1, wherein the at least one processor is further programmed to determine a reason code associated with the final score based at least in part on the one or more weight values, and the reason code is electronically transmitted as part of the one or more alerts to the user device.

10. The parallel hybrid model analysis system of claim 1, wherein the at least one data record is a payment transaction, and at least one of the first set of models and the second model is trained to detect a potential money laundering scheme that includes the at least one data record.

11. A computer-implemented method for parallel hybrid model analysis (PHMA), the computer-implemented method implemented on a computing device comprising a memory device coupled to at least one processor, the at least one processor being in communication with a PHMA server, the computer-implemented method comprising:

storing, at the PHMA server, a plurality of models including a first set of models of a first model type and a second model of a second model type, wherein the first model type is a clustering model type and the second model type is a neural network model type;

receiving at least one data record to be analyzed by the plurality of models;

determining, based on one or more parameters of the at least one data record, which model of the first set of models to execute on the at least one data record;

executing, via the PHMA server, the determined model of the first set of models with the at least one data record as input to (i) assign the at least one data record to a cluster associated with the determined model, including a cluster ID corresponding to the assigned cluster, and (ii) output one or more weight values associated with the cluster ID assigned to the at least one data record by the determined model, the determined model trained on data records associated with a first parameter option associated with the one or more parameters of the at least one data record;

executing, via the PHMA server, the second model with the at least one data record as input to output a partial score from the second model, the second model trained on data records associated with a second parameter option associated with the one or more parameters of the at least one data record;

modify the partial score by (i) combining, via the PHMA server, the one or more weight values with the partial score and (ii) adjusting a sensitivity of the partial score;

generating a final score based on the modified partial score;

analyzing, via the PHMA server, the final score in real-time, including comparing, via the PHMA server, the final score to a score threshold to determine whether to electronically transmit one or more alerts associated with the score threshold to a user device; and based on a determination that the final score satisfies the score threshold, electronically transmitting, via the PHMA server, the one or more alerts to the user device.

12. The computer-implemented method of claim 11, wherein each model of the first set of models is associated with a respective option of a multi-option parameter of the one or more parameters of the at least one data record, the computer-implemented method further comprising:

determining, based on the one or more parameters of the at least one data record, which option of the multi-option parameter to associate with the at least one data record.

13. The computer-implemented method of claim 12, further comprising preprocessing, via the PHMA server, the at least one data record including determining the one or more parameters of the at least one data record and formatting the at least one data record for input into the plurality of models.

14. The computer-implemented method of claim 11, wherein the second model is a second set of models, the computer-implemented method further comprising:

determining which model of the second set of models to execute based on the one or more parameters of the at least one data record.

15. The computer-implemented method of claim 11, wherein the clustering model type is a K-means clustering model and the cluster ID is associated with a cluster of the K-means clustering model.

16. The computer-implemented method of claim 15, wherein the one or more weight values are based on which cluster of the K-means clustering model the at least one data record is assigned to.

17. The computer-implemented method of claim 11, wherein the second model type is trained using a multilayer perception algorithm via supervised machine learning.

18. The computer-implemented method of claim 11 further comprising determining a reason code associated with the final score based at least in part on the one or more weight values and electronically transmitting the reason code as part of the one or more alerts to the user device.

19. The computer-implemented method of claim 11, wherein the at least one data record is a payment transaction, and at least one model of the first set of models and the second model is trained to detect a potential money laundering scheme that includes the at least one data record.

20. At least one non-transitory computer-readable storage media having computer-executable instructions embodied thereon for parallel hybrid model analysis (PHMA), wherein when executed by at least one processor of a PHMA system, the at least one processor being in communication with a PHMA server, the computer-executable instructions cause the at least one processor to:

store, at the PHMA server, a plurality of models including a first set of models of a first model type and a second model of a second model type, wherein the first model type is a clustering model type and the second model type is a neural network model type;

receive at least one data record to be analyzed by the plurality of models;

determine, based on one or more parameters of the at least one data record, which model of the first set of models to execute on the at least one data record; and cause the PHMA server to:

execute the determined model of the first set of models with the at least one data record as input to (i) assign the at least one data record to a cluster associated with the determined model, including a cluster ID corresponding to the assigned cluster, and (ii) output one or more weight values associated with the cluster ID assigned to the at least one data record by the determined model, the determined model trained on data records associated with a first parameter option associated with the one or more parameters of the at least one data record;

execute the second model with the at least one data record as input to output a partial score from the second model, the second model trained on data records associated with a second parameter option associated with the one or more parameters of the at least one data record;

modify the partial score by (i) combining the one or more weight values with the partial score and (ii) adjusting a sensitivity of the partial score;

generate a final score based on the modified partial score;

analyze the final score in real-time, including comparing the final score to a score threshold to determine whether to electronically transmit one or more alerts associated with the score threshold to a user device; and based on a determination that the final score satisfies the score threshold, electronically transmit the one or more alerts to the user device.

* * * * *